May 17, 1927. 1,628,955

J. W. DE PRIES

OIL FILTER

Filed May 12, 1926

Inventor
J. W. De Pries,

By *Clarence A. O'Brien*
Attorney

Patented May 17, 1927.

1,628,955

UNITED STATES PATENT OFFICE.

JOHN W. DE PRIES, OF McCOY, OREGON.

OIL FILTER.

Application filed May 12, 1926. Serial No. 108,570.

This invention relates to oil filters primarily adapted for installation in the oil feed line of an automobile internal combustion engine for filtering the oil prior to the passage of the same into the working parts of the engine for preventing the accumulation of grit, metal particles and the like within the engine bearing, cylinders, etc. which materially impairs the operation of the engine.

The invention further aims to provide an oil filter of the aforementioned character that is relatively simple in construction, comprising few parts that may be readily separated for repair or renewal purposes.

An additional object of the invention will become apparent as the nature of the invention is better understood, the same comprising the novel form, combination, and arrangement of parts hereinafter more fully described, shown in the accompanying drawing and claimed.

In the drawing wherein like reference characters indicate corresponding parts throughout the several views.

Figure 1:
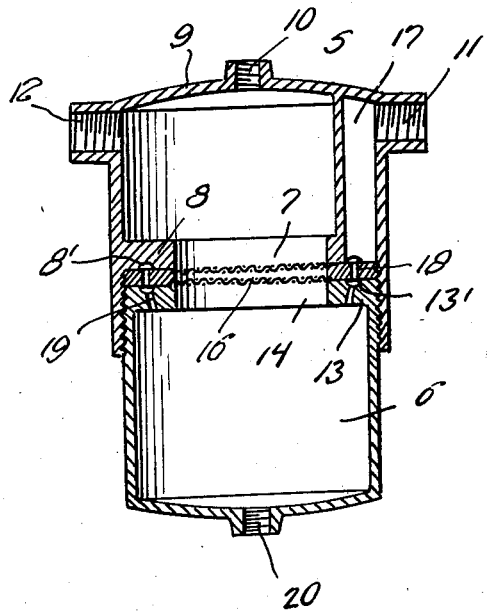
Figure 1 is a vertical detail section of an oil filter constructed in accordance with the present invention.
Figure 2:
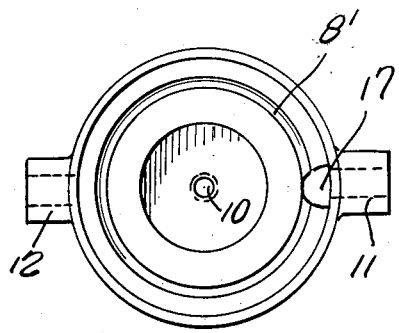
Figure 2 is a bottom plan view of the upper cylindrical section of the filter.
Figure 4:
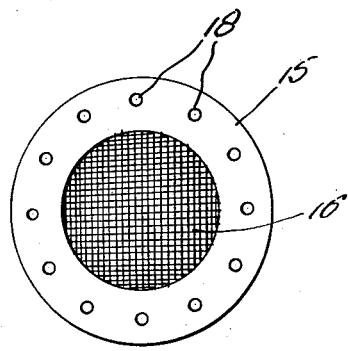
Figure 4 is a plan view of the oil filtering unit, per se.
Figure 3:
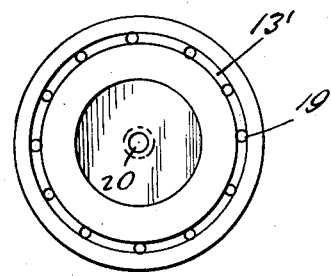
Figure 3 is a top plan view of the lower cylindrical section.

Now having particular reference to the drawing, my novel filter constitutes the provision of a pair of interfitting cylindrical sections 5 and 6 adapted for arrangement in superposed relation as clearly disclosed in Figure 1. The upper cylindrical section 5 is formed with a central circular opening 7 within its bottom wall 8, the top wall 9 of which is formed with a central internally threaded cap 10 within which is normally a plug for closing the same. The side wall of this upper cylindrical section is formed at its upper end with diametrically opposed internally threaded inlet and outlet nipples 11 and 12 respectively within which are adapted for arrangement oil pipes (not shown), the oil pipe associated with the nipple 11 leading from the oil pump while the pipe within the nipple 12 leads to the working part of the engine.

The side wall of the cylindrical section 5 depends from the bottom wall 8 thereof and is internally threaded as shown for receiving the externally threaded upper end of the lower cylindrical section 6 which is of lesser cross sectional area than the upper section as disclosed. The top wall 13 of this lower section is formed centrally with a circular opening 14 that registers with the opening 7 in the bottom wall 8 of the top section 5 when arranged within the top section so as to permit the oil to flow from the section 6 upwardly into the section 5 and thence through the nipple 12.

The adjacent faces of the bottom wall 8 of the top sections 5 and the top wall 13 of the lower section 6 are formed concentrically with the openings with oil conveying grooves 8' and 13' respectively, while adapted for clamping engagement between said walls of the sections is the annular metallic rim 15 of a filtering disc 16 preferably consisting of a pair of spaced circular screen strips between which may be and preferably is arranged a suitable porous filtering fabric (not shown).

Formed vertically within the upper cylindrical section 5 at the side wall thereof and in communication with the inlet 11 is an oil pipe 17 that conveys the oil downwardly to the oil channel 8' in the bottom wall of the section 5 whence it passes through openings 18 in the rim 15 of the filtering unit which openings are to be placed in registration with openings 19 extending through the top wall 13 of the lower section 6 leading from its channel 13' in order that the oil will flow into the section 6, and by the continued action of the pump, the same will be forced upwardly through the filtering unit into the upper section 5 through the discharge 12 into the engine by reason of the pipe section (not shown).

The lower section 6 is also constructed at its bottom wall with a cap 20 in order that the filter may be cleaned by air pressure and this obviously by applying an air pipe to the cap 10 of the section 5 which will forcibly discharge the sediment through the cap 20.

It will thus be seen that I have provided a highly novel, simple, and efficient form of oil filter for automobile engines that is well adapted for all the purposes heretofore designated, even though I have herein shown and described the invention as consisting of certain detail structural elements it is nevertheless to be understood that departures may be had therefrom without affecting the spirit and scope of the appended claim.

Having thus described the invention, what I claim as new and desire to secure by Letters Patent is:—

In an oil filter of the class described, a pair of interfitting cylindrical filter chamber sections arranged in superposed relation, the upper section being formed with inlet and outlet openings adjacent the top thereof, the adjacent bottom and top wall of the upper and lower sections being formed centrally with registering openings, the adjacent faces of said walls being formed with oil channels arranged concentrically of the openings, a filter screen arranged horizontally between the bottom and top walls of the upper and lower sections respectively, and consisting of a metallic ring, and a filter screen within the center thereof, said ring being formed with spaced openings adapted to register with the aforementioned oil channels, the top wall of the lower section being formed with openings in registration with the openings in said filtering ring for permitting the oil to pass into the lower section, and a pipe formed within the upper section for delivering the oil from the inlet opening to the oil channel in the bottom wall of the upper section, the oil thence passing through the openings in the filter ring and the lower section top wall into said lower section and thence upwardly through the filter screen into the upper section, and then through the outlet opening of said upper section.

In testimony whereof I affix my signature.

JOHN W. DE PRIES.